(12) United States Patent
Skinkle et al.

(10) Patent No.: US 11,473,954 B2
(45) Date of Patent: Oct. 18, 2022

(54) MANIFOLD

(71) Applicant: MICRO MOTION, INC., Boulder, CO (US)

(72) Inventors: David Skinkle, Boulder, CO (US); Anthony William Pankratz, Arvada, CO (US); Jeffry D. Foster, St. Louis Park, MN (US)

(73) Assignee: MICRO MOTION, INC., Boulder, CO (US)

( * ) Notice: Subject to any disclaimer, the term of this patent is extended or adjusted under 35 U.S.C. 154(b) by 0 days.

(21) Appl. No.: 17/261,152

(22) PCT Filed: Jul. 27, 2018

(86) PCT No.: PCT/US2018/044082
§ 371 (c)(1),
(2) Date: Jan. 18, 2021

(87) PCT Pub. No.: WO2020/023056
PCT Pub. Date: Jan. 30, 2020

(65) Prior Publication Data
US 2021/0270654 A1    Sep. 2, 2021

(51) Int. Cl.
*G01F 1/84*    (2006.01)
*F15D 1/06*    (2006.01)

(52) U.S. Cl.
CPC ............. *G01F 1/8409* (2013.01); *F15D 1/06* (2013.01); *G01F 1/8404* (2013.01)

(58) Field of Classification Search
CPC ........ G01F 1/84; G01F 1/8409; G01F 1/8468; G01F 1/8472; G01F 1/8477
See application file for complete search history.

(56) References Cited

U.S. PATENT DOCUMENTS

| 6,240,775 B1 | 6/2001 | Uramachi et al. |
| 8,931,353 B2 * | 1/2015 | Mokady ............... G01F 1/8409 |
| | | 73/861.354 |
| 10,240,958 B2 * | 3/2019 | Blackmore ........... G01F 1/8404 |
| 2017/0261474 A1 * | 9/2017 | Zhu ....................... G01F 1/8477 |

FOREIGN PATENT DOCUMENTS

| EP | 2843375 A1 | 3/2015 |
| JP | S5811190 U | 7/1981 |
| JP | 2010133644 A | 6/2010 |
| JP | 2010190523 A | 9/2010 |
| JP | 3196798 U | 4/2015 |
| WO | 2008024112 A1 | 2/2008 |
| WO | 2017048235 A1 | 3/2017 |

* cited by examiner

*Primary Examiner* — Erika J. Villaluna
(74) *Attorney, Agent, or Firm* — The Ollila Law Group LLC

(57) ABSTRACT

A manifold (400, 600, 700) with reduced vortex shedding, a vibrator) meter (5) including the same, and a method of manufacturing both are described. The manifold (400, 600, 700) comprises a first conduit section (202), a second conduit section (204), a splitter section (406, 606, 706) positioned between the first conduit section (202) and the second conduit section (204), the splitter section (406, 606, 706) including a first splitter face (408a, 608a, 708) facing the first conduit section (202), and a first protrusion (412a, 612a, 712), at least a portion of which is positioned on the first splitter face (408a, 608a, 708).

19 Claims, 9 Drawing Sheets

MANIFOLD

TECHNICAL FIELD

The examples described below relate to a manifold and methods for manufacturing a manifold. More particularly, the examples are directed to a manifold with a splitter including a protrusion.

BACKGROUND

Dual-conduit Coriolis mass flowmeters operate by detecting the motion of a pair of vibrating conduits, or flow tubes, that contain a flowing material. Properties associated with the material in the conduit, such as mass flow, density and the like, can be determined by processing measurement signals received from pickoffs, or motion transducers, associated with the conduit.

Vibratory meters can include assemblies with straight or curved conduits. As material begins to flow through the conduits, Coriolis forces cause each point along the conduits to have a different phase. For example, the phase at the inlet end of the flowmeter lags the phase at the centralized driver position, while the phase at the outlet leads the phase at the centralized driver position. Pickoffs on the conduits produce sinusoidal signals representative of the motion of the conduits. Signals output from the pickoffs are processed to determine the time delay between the pickoffs. The time delay between the two or more pickoffs is proportional to the mass flow rate of material flowing through the conduits.

A meter electronics connected to the driver generates a drive signal to operate the driver, and to determine a mass flow rate and/or other properties of a process material from signals received from the pickoffs. The driver may comprise any one of many well-known arrangements; however, a magnet and an opposing drive coil are one of the most common formats. An alternating current is passed to the drive coil for vibrating the conduits at a desired conduit amplitude and frequency. The pickoffs often also comprise a magnet and coil arrangement, similar to the driver.

A dual-conduit Coriolis sensor splits the flow stream into two paths at an inlet manifold, providing one stream for each respective conduit, and then rejoins the stream at a second manifold before the outlet of the sensor. The convergence of the two flow paths at the second manifold before the outlet often occurs in a larger transition volume that matches the diameter of a process pipeline. When the two flow paths rejoin, they flow over a manifold splitter, the trailing edge of the manifold. Especially in the cases when a flow of a gas is being measured, the flow over the splitter can produce vortex shedding in the fluid flow. Vortex shedding is an oscillating flow that takes place when a fluid such as air or water flows past a blunt body at certain velocities, depending on the size and shape of the body. The vortex shedding may further result in vibrations and unwanted audible noise.

Accordingly, there is a need for a manifold for a Coriolis flow meter with reduced vortex shedding and acoustical noise.

SUMMARY

According to a first aspect, a manifold with reduced vortex shedding is provided. The manifold comprises a first conduit section, a second conduit section, a splitter section, positioned between the first conduit section and the second conduit section, the splitter section including a first splitter face facing the first conduit section, and a first protrusion at least a portion of which is positioned on the first splitter face.

According to a second aspect, a method for manufacturing a manifold with reduced vortex shedding is provided. The method comprises forming a first conduit section, forming a second conduit section, forming a splitter section positioned between the first conduit section and the second conduit section, the splitter section including a first splitter face facing the first conduit section, and forming a first protrusion at least a portion of which is positioned on the first splitter face.

Aspects

In a further aspect, the first protrusion may have a round shape.

In a further aspect, the first protrusion may have an elongated shape.

In a further aspect, the first protrusion may comprise a depressed region.

In a further aspect, the first protrusion may extend beyond a lip of the splitter section.

In a further aspect, the splitter section may further comprise a second splitter face facing the second conduit section, and the manifold may further comprise a second protrusion, at least a portion of which is positioned on the second splitter face.

In a further aspect, the first protrusion may be a first size and the second protrusion may be a second size.

In a further aspect, the first protrusion may be a first shape and the second protrusion may be a second shape.

In a further aspect, the manifold may further comprise at least one additional protrusion positioned on at least one of the first splitter face or the second splitter face.

In a further aspect, a vibratory meter with a manifold according to the first aspect is provided. The vibratory meter may further comprise a first conduit, a second conduit, a pickoff coupled to at least one of the first conduit or the second conduit, and a driver coupled to at least one of the first conduit or the second conduit.

In a further aspect, the first protrusion may comprise a round shape.

In a further aspect, the first protrusion may have an elongated shape.

In a further aspect, the first protrusion may comprise a depressed region.

In a further aspect, the first protrusion may extend beyond a lip of the splitter section.

In a further aspect, the splitter section may further comprise a second splitter face facing the second conduit section, and the method may further comprise forming a second protrusion positioned on the second splitter face.

In a further aspect, the first protrusion may be a first size and the second protrusion may be a second size.

In a further aspect, the first protrusion may be a first shape and the second protrusion may be a second shape.

In a further aspect, a method for manufacturing a vibratory meter comprising a manifold manufactured according to the second aspect is provided. The method may further comprise coupling the first conduit section of the manifold to a first conduit, coupling the second conduit section of the manifold to a second conduit, coupling a pickoff to at least one of the first conduit or the second conduit, and coupling a driver to at least one of the first conduit or the second conduit, the driver being configured to vibrate the first conduit and the second conduit.

BRIEF DESCRIPTION OF THE DRAWINGS

The same reference number represents the same element on all drawings. The drawings are not necessarily to scale.

DETAILED DESCRIPTION

The present Application describes a manifold with reduced vortex shedding, a vibratory meter including said manifold, and methods of manufacturing both the manifold and the vibratory meter.

Figure 1:
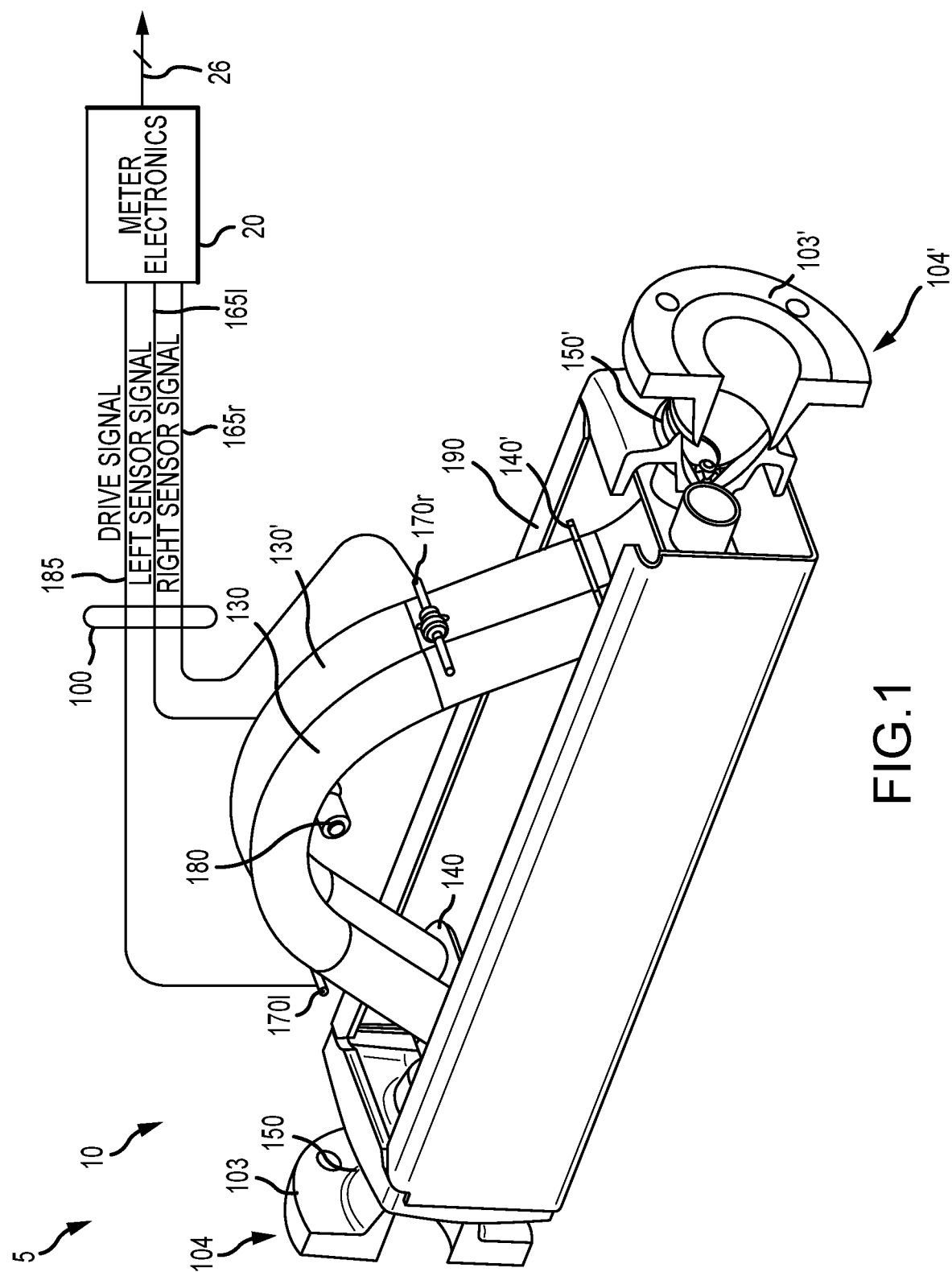
FIG. 1 depicts a vibratory flowmeter, in accordance with an example.

FIG. 1 depicts a vibratory meter 5 with a manifold 150 in accordance with an example. As shown in FIG. 1, the vibratory meter 5 comprises a meter assembly 10 and meter electronics 20. The meter assembly 10 responds to the mass flow rate and density of a process material. The meter electronics 20 is connected to the meter assembly 10 via leads 100 to provide density, mass flow rate, and temperature information over communications path 26, as well as other information. Information and commands may be further received at meter electronics 20 over communications path 26.

A Coriolis flow meter structure is described, although this is not intended to be limiting. Those of skill will readily understand that the present Application could be practiced as a vibrating tube densitometer, tuning fork densitometer, or the like.

The meter assembly 10 includes a pair of manifolds 150 and 150', flanges 103 and 103', a pair of parallel first and second conduits 130 and 130', driver 180, a pair of pick-off sensors 170*l* and 170*r*, and a case 190.

The first and second conduits 130, 130' bend at two symmetrical locations along their length and are essentially parallel throughout their length. Brace bars 140 and 140' serve to define the axis (not visible) about which each first and second conduit 130, 130' oscillates. The legs of the first and second conduits 130, 130' are fixedly attached to manifolds 150 and 150'. This provides a continuous closed material path through meter assembly 10.

When flanges 103 and 103' are connected to a process line (not shown) carrying the process material, material enters an inlet end 104 of the meter through an orifice in the flange 103 and is conducted through the manifold 150. Within the manifold 150, the material is divided and routed through the first and second conduits 130, 130'. Upon exiting the first and second conduits 130, 130', the process material is recombined in a single stream in the manifold 150' and is thereafter routed to outlet end 104' back to the process line (not shown).

A case 190 encloses at least a portion of the conduits 130, 130', the driver 180, and the pick-offs 170*l*, 170*r*. Manifolds 150 and 150' may be coupled to the case 190.

The first and second conduits 130, 130' are selected to have substantially the same mass distribution, moments of inertia and Young's modulus about their bending axes, which are defined by the brace bars 140, 140'.

Both first and second conduits 130, 130' are driven by driver 180 in opposite directions about their respective bending axes and at what is termed the first out-of-phase bending mode of the flow meter. This driver 180 may comprise, for example, a magnet mounted to the first conduit 130' and an opposing coil mounted to the second conduit 130'. An alternating current is passed through the coil to vibrate both the first and second conduits 130, 130'. A suitable drive signal is applied by the meter electronics 20, via lead 185, to the driver 180.

The meter electronics 20 receives the left and right pickoff signals appearing on leads 165*l*, 165*r*, respectively. The meter electronics 20 provides a signal via lead 185 to vibrate first and second conduits 130, 130' via driver 180. The left and right pick-off 170*l*, 170*r* signals are used by the meter electronics 20 to compute the mass flow rate and/or the density of the material passing through meter assembly 10. This information, along with other information, may be transmitted by meter electronics 20 over communications path 26.

While FIG. 1 depicts a single meter assembly 10 in communication with meter electronics 20, those skilled in the art will readily appreciate that multiple sensor assemblies may be in communication with meter electronics 20. Further, meter electronics 20 may be capable of operating a variety of different sensor types. Each sensor assembly, such as the meter assembly 10 in communication with meter electronics 20, may have a dedicated section of a storage system within meter electronics 20.

Meter electronics 20 may include various other components and functions, as will be understood by those of skill. These additional features may be omitted from the description and the figures for brevity and clarity.

Figure 2:
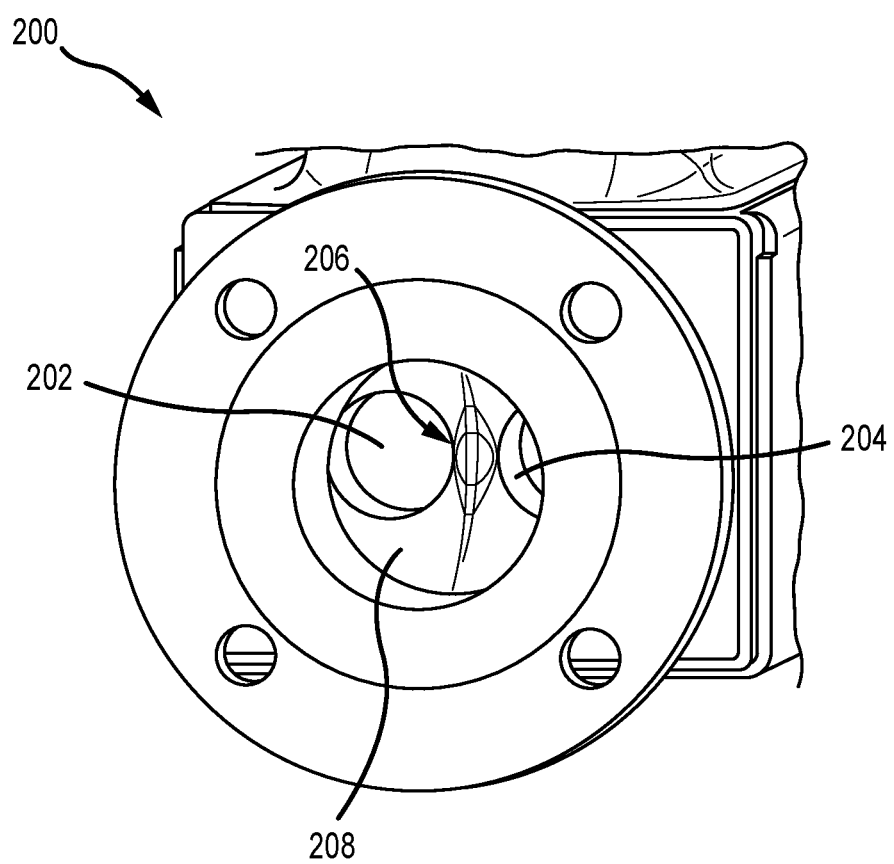
FIG. 2 depicts a perspective view of a manifold.
Figure 3:
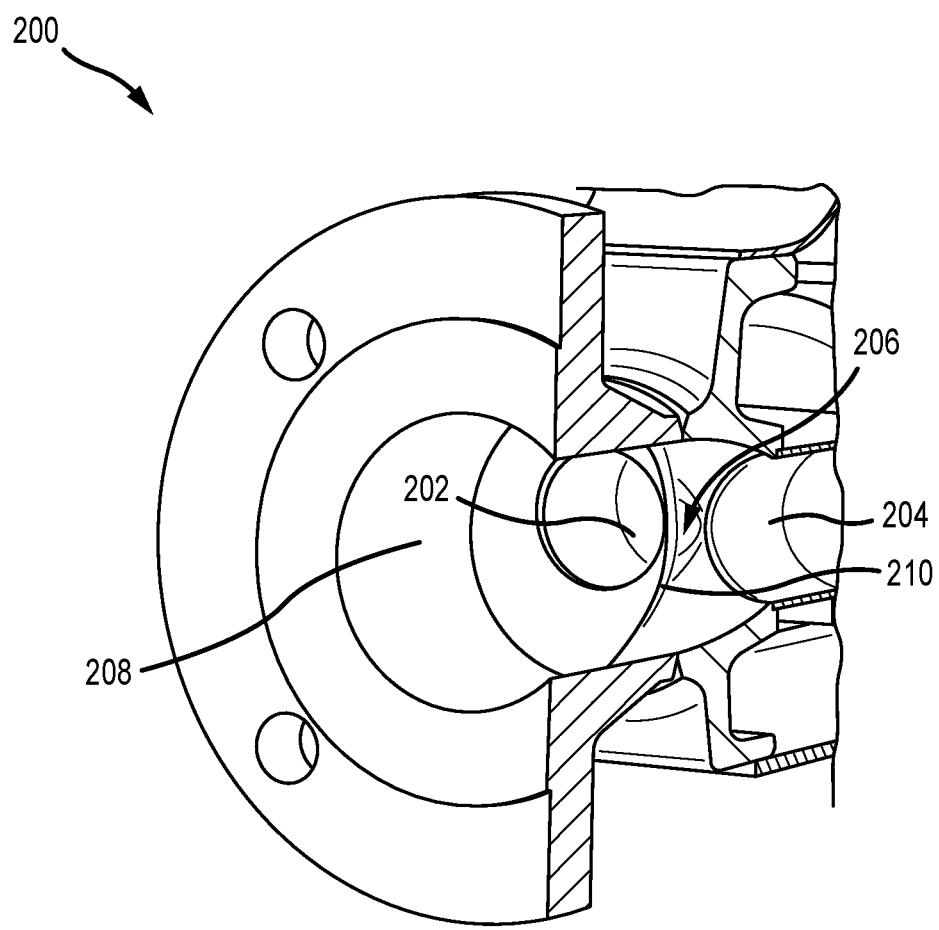
FIG. 3 depicts a perspective cutaway view of a manifold.

FIGS. 2 and 3 depict a manifold 200 according to prior methods, with FIG. 2 depicting a perspective view, and FIG. 3 depicting a cutaway view. As may be seen, manifold 200 includes a first conduit section 202, a second conduit section 204, a splitter section 206 between the first and second conduit sections 202, 204, and a combined flow section 208. The first and second conduit sections 202 and 204 may each be coupled to a respective conduit 130, 130'. The combined flow section 208 is fluidly coupled to the first conduit section 202 and the second conduit section 204.

Prior manifold splitter section 206 provides a smooth transition between the first and second conduit sections 202, 204 and the combined flow section 208. Prior splitter section 206 includes a lip 210 between the first and second conduit sections 202 and 204 with an edge radius and thickness that is uniform across the length of the splitter. The blunt edge of lip 210 may result in vortex shedding and flow noise, especially when manifold 200 is installed in a gas pipeline.

Figure 4:
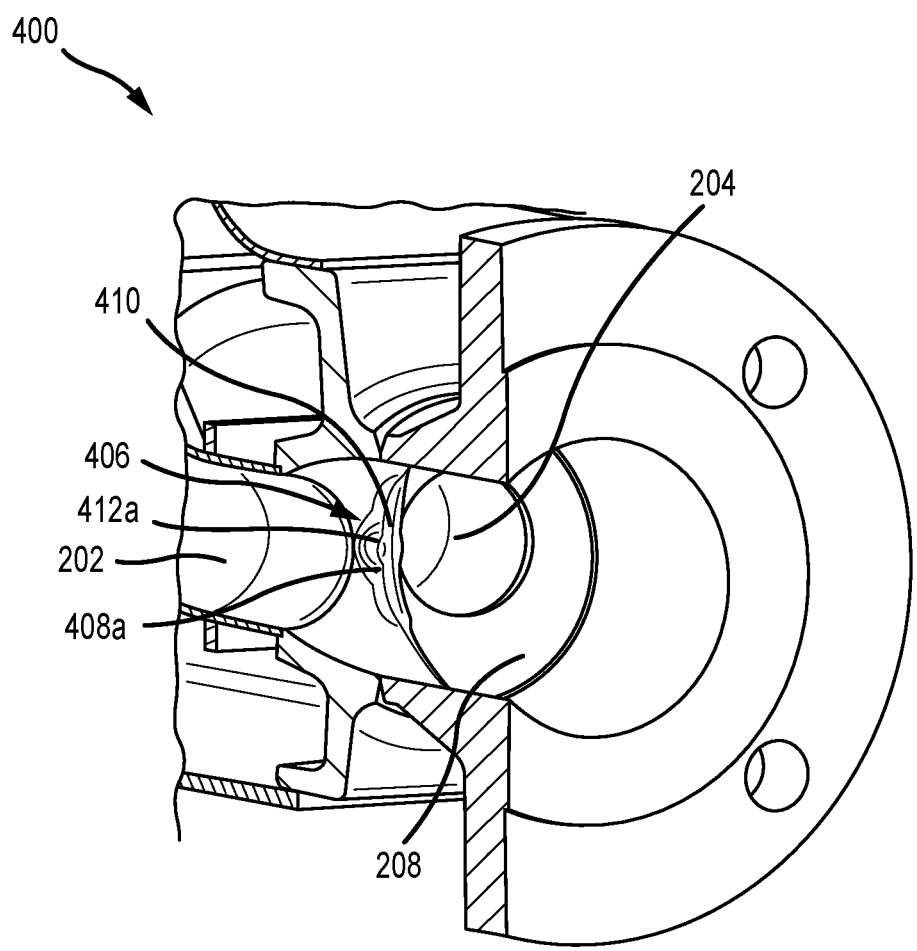
FIG. 4 depicts a perspective cutaway view of a manifold, in accordance with an example.

FIG. 4 depicts a cutaway view of manifold 400 according to an example of the Application. Manifold 400 also includes the first conduit section 202, the second conduit section 204, and the combined flow section 208. Manifold 400 differs from manifold 200, however, because it includes splitter section 406, positioned between the first conduit section 202 and the second conduit section 204. Splitter section 406 includes lip 410.

Splitter section 406 includes a first splitter face 408*a* facing the first conduit section 202. First splitter face 408*a* is a surface positioned on the first conduit section 202 side of the lip 410. In examples, first splitter face 408*a* may comprise a cross section of a saddle-shaped surface. In further examples, first splitter face 408*a* may comprise a cross section of a cone, planar, or any other shape known to those of skill.

Manifold 400 further includes a first protrusion 412a, at least a portion of which is positioned on the first splitter face 408a. First protrusion 412a may help disturb or break up the flow of fluid at the splitter section 406, providing for the separation of fluid into streams that produce fewer coherent vortices.

In examples, first protrusion 412a may comprise a round shape. For example depicted in FIGS. 4 and 5, first protrusion 412a comprises a cross-section of a sphere.

In examples, manifold 400 may be positioned at outlet end 104' of meter assembly 10. In further examples, manifold 400 may alternatively be positioned at other points in the process path where two flow paths join into a single flow path, such as a downstream edge of a Y-fitting where two flow paths converge. In further examples, however, manifold 400 may be positioned at inlet end 104. Other positions for manifold 400 are also possible, as will be understood by those of skill.

Figure 5:
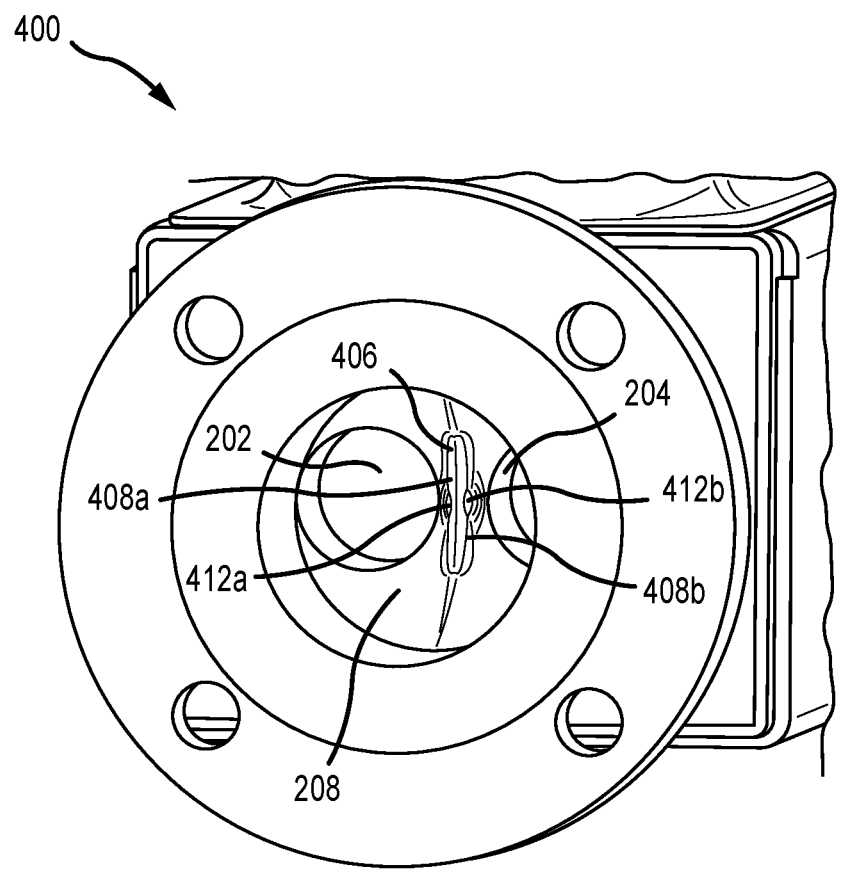
FIG. 5 depicts a perspective view of a manifold, in accordance with an example.

In examples, as may be seen in FIG. 5, the splitter section 406 of the manifold 400 may further comprise a second splitter face 408b facing the second conduit section 204, and a second protrusion 412b positioned on the second splitter 408b face. Like first protrusion 412a, second protrusion 412b may also be round. In further embodiments, however, second protrusion 412b may be any shape operable to disturb the flow of fluid at splitter section 406.

In examples, first and second protrusions 412a, 412b may be the same shape, or different shapes. In further examples, first and second protrusions 412a, 412b may be the same size or different sizes. By providing two different shapes or sizes of protrusion, it may be possible to further disrupt the flow of fluid over splitter section 406.

Figure 6:
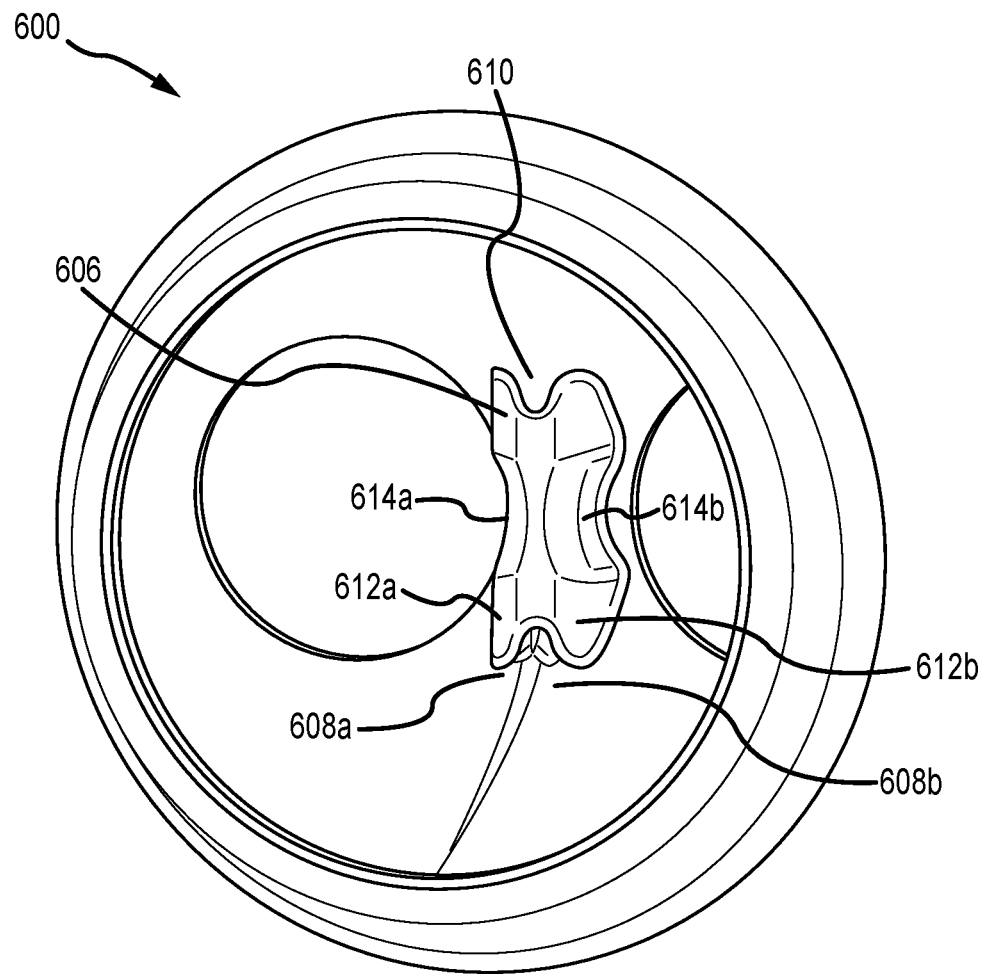
FIG. 6 depicts a perspective view of a manifold, in accordance with an example.

In further examples, first protrusion 412a may be square, oval, irregular, or any other shape. For example, FIG. 6 depicts a perspective view of manifold 600. Manifold 600 includes splitter section 606 and lip 610. Splitter section 606 includes a first protrusion 612a, at least a portion of which is positioned on first splitter face 608a. The first protrusion 612a includes an elongated shape that is positioned so that the longest dimension is substantially parallel to the lip 610. By providing an elongated first protrusion 612a, manifold 600 may further help disturb the flow of fluid over the splitter section 606.

In examples, the first protrusion 612a may include a first depressed region 614a. The depressed region 614a may further help to reduce the formation of streams with the potential to produce coherent vortices in manifold 600.

In examples, manifold 600 may further include a second protrusion 612b positioned on a second splitter face 608b. The second protrusion 612b may include a second depressed region 614b, also operable to reduce the formation of coherent vortices. In examples, the first and second protrusions 614a and 614b may form a saddle-shaped feature on splitter section 606, as depicted in FIG. 6.

Figure 7:
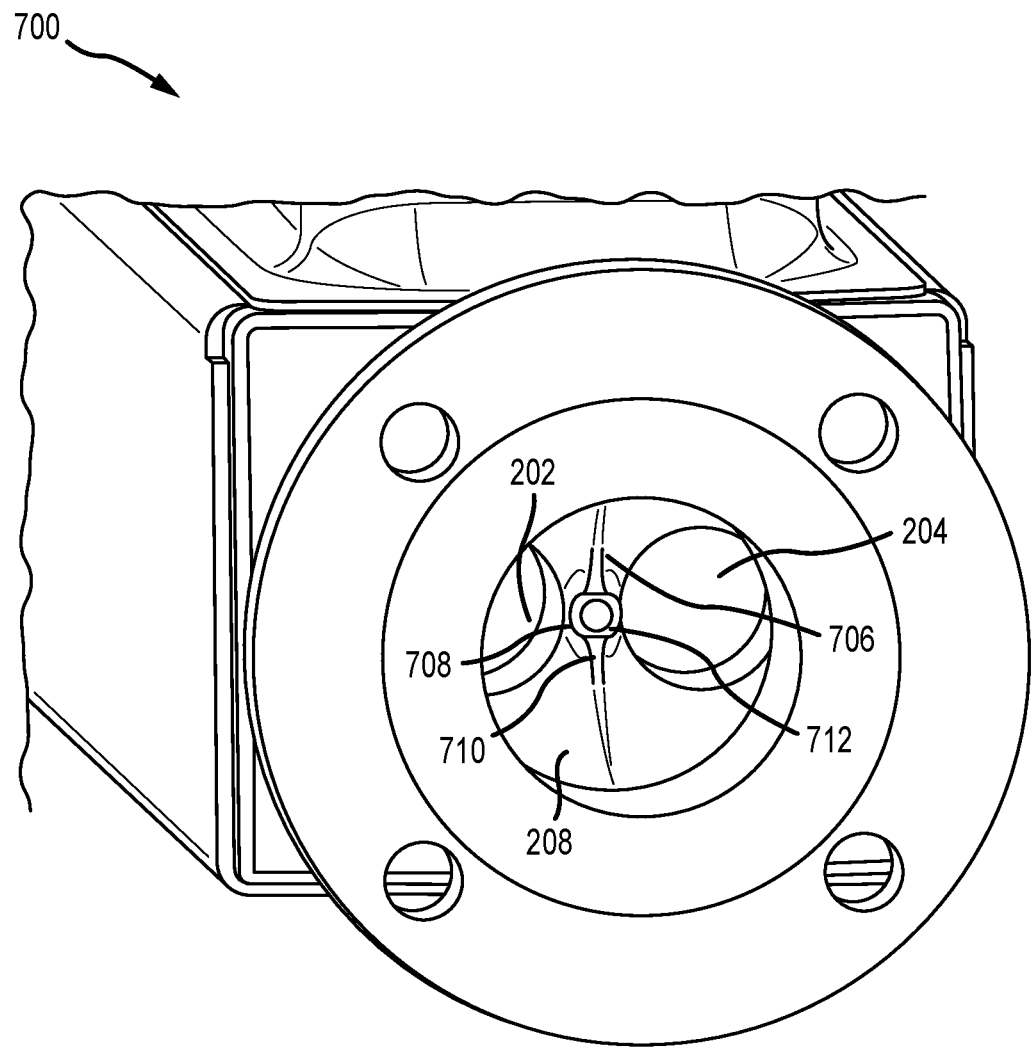
FIG. 7 depicts a perspective view of a manifold, in accordance with an example.

FIG. 7 further depicts example manifold 700, including a splitter section 706. The splitter section 706 includes a first protrusion 712 positioned on a first splitter face 708. The first protrusion 712 extends beyond a lip 710, in the direction of the combined flow section 208. Because first protrusion 712 extends beyond lip 710, it may help disturb the flow of fluid on both sides of the splitter section 706. In examples, manifold 700 may further include a second protrusion (not pictured).

While examples of one or two protrusions have been provided, those of skill will readily understand that manifold 400, 600, or 700 may comprise three, or any greater number of protrusions.

Figure 8:
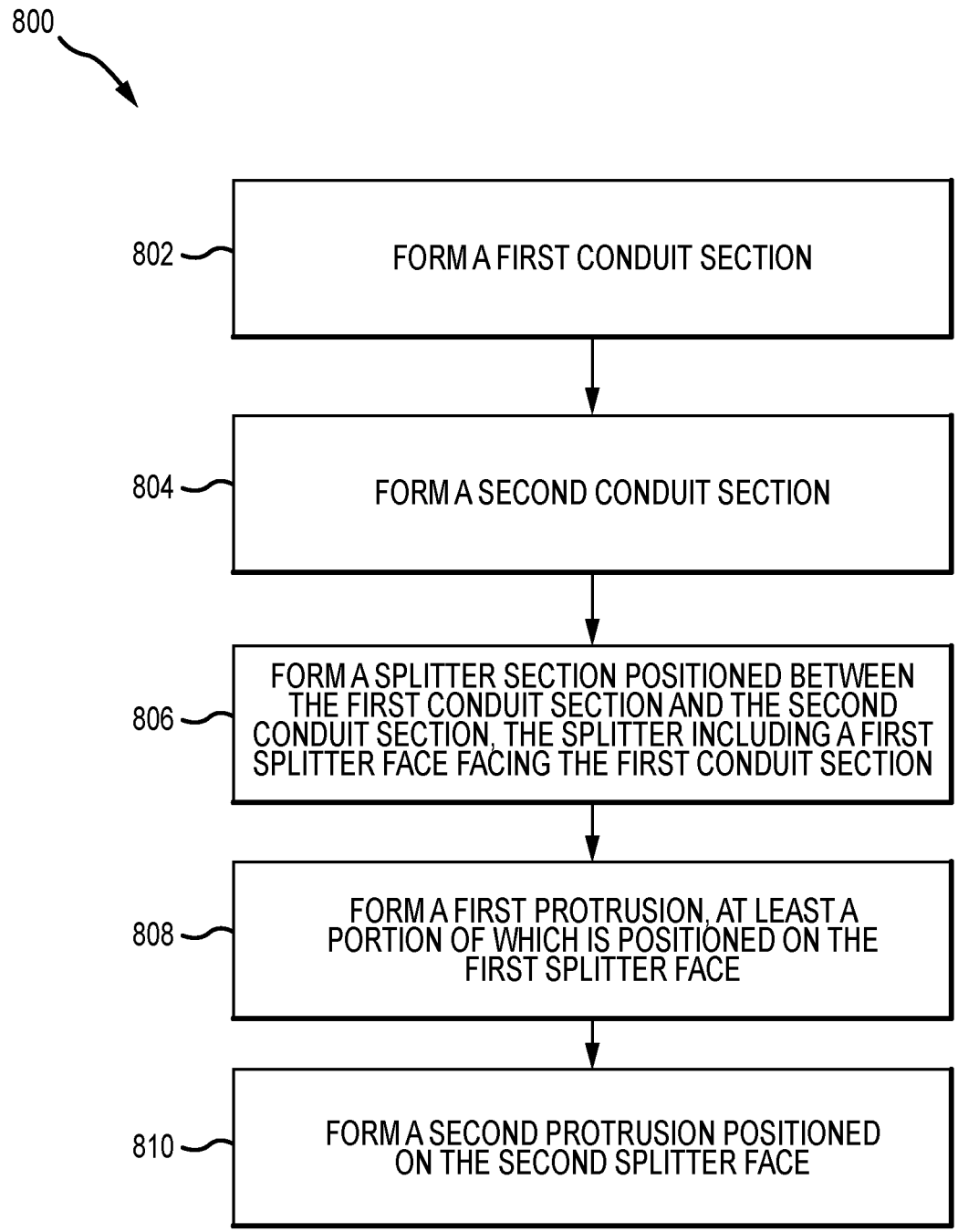
FIG. 8 depicts a method, in accordance with an example.

FIG. 8 depicts method 800, which may be performed to manufacture a manifold with reduced vortex shedding.

Method 800 begins with steps 802 and 804. In step 802, a first conduit section 202 is formed, and in step 804, a second conduit section 204 is formed.

Method 800 continues with step 806. In step 806, a splitter section 406, 606, 706 is formed, positioned between the first conduit section 202 and the second conduit section 204, the splitter section 406, 606, 706 including a first splitter face 408a, 608a facing the first conduit section 202.

Method 800 continues with step 808. In step 808, a first protrusion 412a, 612a, 712 is formed, positioned on the first splitter face 408a, 608a.

In examples, method 800 may further include step 810. In step 810, a second protrusion 412b, 612b may be formed, positioned on the second splitter face 408b, 608b.

In examples, any of first or second conduit sections 202, 204, splitter section 406, 606, 706, first protrusion 412a, 612a, 712, or second protrusion 412b, 612b may be formed by machining, casting, welding, three-dimensional printing, or any other manufacturing technique known to those of skill. In examples, manifold 400, 600, 700 may be formed as a single, integrated body, or any portion of first or second conduit sections 202, 204, splitter section 406, 606, 706, first protrusion 412a, 612a, 712, or second protrusion 412b, 612b may be formed separately and coupled together via welding, brazing, gluing, and so forth, to form manifold 400, 600, 700.

Figure 9:
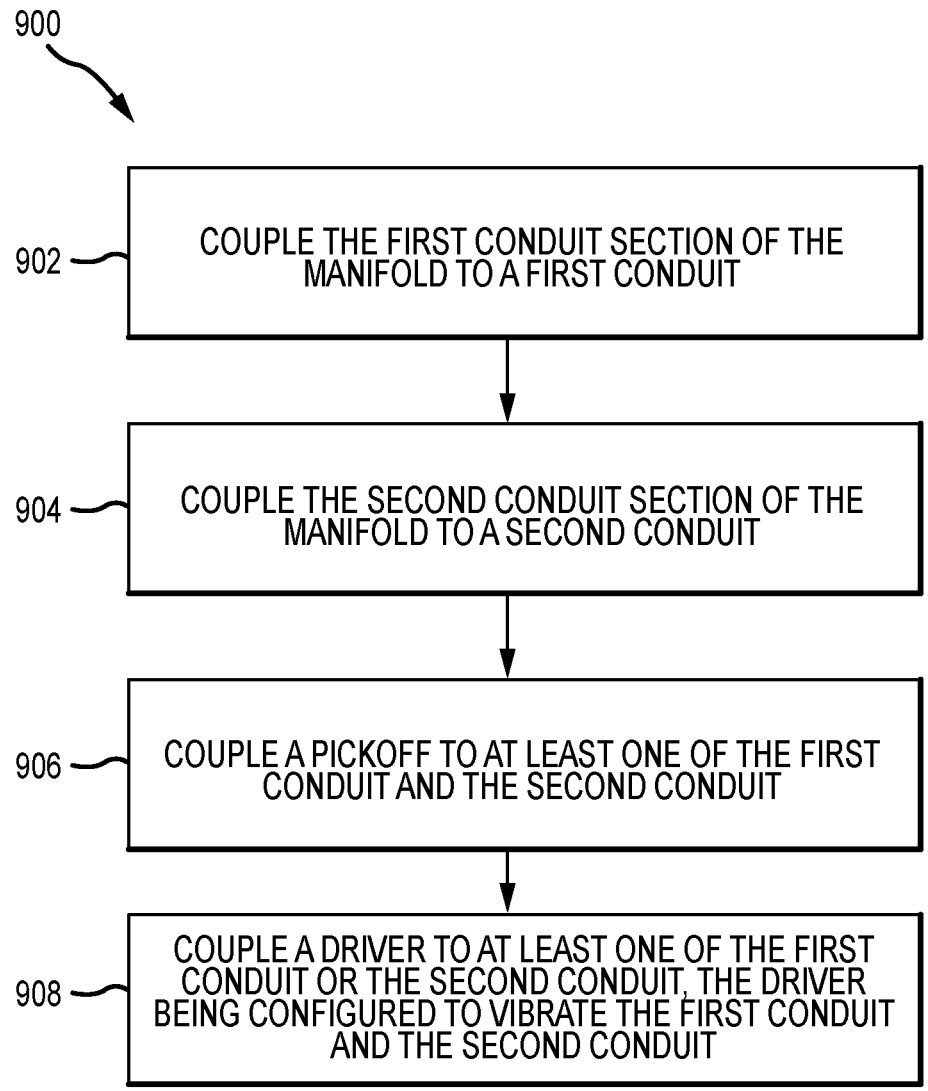
FIG. 9 depicts a method, in accordance with an example.

FIG. 9 depicts method 900, which may be executed to manufacture a vibratory meter comprising a manifold with reduced vortex shedding according to any of the steps of method 800.

Method 900 begins with steps 902 and 904. In step 902, the first conduit section of the manifold is coupled to a first conduit. In step 904, the second conduit section of the manifold is coupled to a second conduit. For example, first conduit section 202 may be coupled to first conduit 130, and second conduit section 204 may be coupled to first conduit 130. In examples, first or second conduits 130, 130' may be coupled to manifold 400, 600, 700 via welding, brazing, or gluing, as will be understood by those of skill.

Method 900 continues with step 906. In step 906, a pickoff is coupled to at least one of the first conduit 130 or the second conduit 130'. For example, left and right pickoffs 170l, 170r may each be welded, brazed, glued, or otherwise attached to a respective first conduit 130 or second conduit 130'.

Method 900 continues with step 908. In step 908, a driver 180 is coupled to at least one of the first conduit 130 or the second conduit 130', the driver 180 being configured to vibrate the first conduit 130 and the second conduit 130'. For example, the driver 180 may be welded, brazed, glued, or otherwise attached to the first conduit 130 and/or the second conduit 130'.

The manifold, vibratory meter, and methods to manufacture both described herein may help reduce vortex shedding, thereby reducing audible noise and vibrations caused by fluid flow in a Coriolis flow meter.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A manifold (400, 600, 700) for reduced vortex shedding, the manifold (400, 600, 700) comprising:
   a first conduit section (202);
   a second conduit section (204);
   a splitter section (406, 606, 706) positioned between the first conduit section (202) and the second conduit section (204), the splitter section (406, 606, 706) including a first splitter face (408a, 608a, 708) facing the first conduit section (202); and
   a first protrusion (412a, 612a, 712), at least a portion of which is positioned on the first splitter face (408a, 608a, 708) and configured to prevent vortex shedding downstream of the splitter section (406, 606, 706) in the manifold.

2. A manifold (400, 600, 700) as claimed in claim 1, wherein the first protrusion (412a, 612a, 712) has a round shape.

3. A manifold (400, 600, 700) as claimed in claim 1, wherein the first protrusion (612a) has an elongated shape.

4. A manifold (400, 600, 700) as claimed in claim 1, wherein the first protrusion (612a) comprises a depressed region (614a).

5. A manifold (400, 600, 700) as claimed in claim 1, wherein the first protrusion (712) extends beyond a lip (710) of the splitter section (706).

6. A manifold (400, 600, 700) as claimed in claim 1, wherein the splitter section (406, 606, 706) further comprises a second splitter face (408b, 608b) facing the second conduit section (204), and the manifold (400, 600, 700) further comprises:
   a second protrusion (412b, 612b), at least a portion of which is positioned on the second splitter face (408b, 608b).

7. A manifold (400, 600, 700) as claimed in claim 6, wherein the first protrusion (412a, 612a, 712) is a first size and the second protrusion (412b, 612b) is a second size.

8. A manifold (400, 600, 700) as claimed in claim 6, wherein the first protrusion (412a, 612a, 712) is a first shape and the second protrusion (412b, 612b) is a second shape.

9. A manifold (400, 600, 700) as claimed in claim 1, further comprising:
   at least one additional protrusion positioned on at least one of the first splitter face (408a, 608a, 708) or the second splitter face (408b, 608b).

10. A vibratory meter comprising:
    a manifold (400, 600, 700) comprising:
      a first conduit section (202),
      a second conduit section (204),
      a splitter section (406, 606, 706) positioned between the first conduit section (202) and the second conduit section (204), the splitter section (406, 606, 706) including a first splitter face (408a, 608a, 708) facing the first conduit section (202), and
      a first protrusion (412a, 612a, 712), at least a portion of which is positioned on the first splitter face (408a, 608a, 708) and configured to prevent vortex shedding downstream of the splitter section (406, 606, 706) in the manifold;
    a first conduit (130);
    a second conduit (130');
    a pickoff (170l, 170r) coupled to at least one of the first conduit (130) or the second conduit (130'); and
    a driver (180) coupled to at least one of the first conduit (130) or the second conduit (130').

11. A method for manufacturing a manifold (400, 600, 700) for reduced vortex shedding, the method comprising:
    forming a first conduit section (202);
    forming a second conduit section (204);
    forming a splitter section (406, 606, 706) positioned between the first conduit section (202) and the second conduit section (204), the splitter section (406, 606, 706) including a first splitter face (408a, 608a, 708) facing the first conduit section (202); and
    forming a first protrusion (412a, 612a, 712), at least a portion of which is positioned on the first splitter face (408a, 608a, 708) and configured to prevent vortex shedding downstream of the splitter section (406, 606, 706) in the manifold.

12. A method as claimed in claim 11, wherein the first protrusion (412a, 612a, 712) has a round shape.

13. A method as claimed in claim 11, wherein the first protrusion (412a, 612a, 712) has an elongated shape.

14. A method as claimed in claim 11, wherein the first protrusion (412a, 612a, 712) comprises a depressed region (614a).

15. A method as claimed in claim 11, wherein the first protrusion (712) extends beyond a lip (710) of the splitter section (706).

16. A method as claimed in claim 11, wherein the splitter section (406, 606, 706) further comprises a second splitter face (408b, 608b) facing the second conduit section (204), and the method further comprises:
    forming a second protrusion (412b, 612b) positioned on the second splitter face (408b, 608b).

17. A method as claimed in claim 16, wherein the first protrusion (412a, 612a, 712) is a first size and the second protrusion (412b, 612b) is a second size.

18. A method as claimed in claim 16, wherein the first protrusion (412a, 612a, 712) is a first shape and the second protrusion (412b, 612b) is a second shape.

19. A method for manufacturing a vibratory meter (5) comprising a manifold (400, 600, 700) for reduced vortex shedding comprising a first conduit section (202), a second conduit section (204), a splitter section (406, 606, 706) positioned between the first conduit section (202) and the second conduit section (204), the splitter section (406, 606, 706) including a first splitter face (408a, 608a, 708) facing the first conduit section (202), and a first protrusion (412a, 612a, 712), at least a portion of which is positioned on the first splitter face (408a, 608a, 708), the first protrusion configured to prevent vortex shedding downstream of the splitter section (406, 606, 706) in the manifold, the method comprising:
    coupling the first conduit section (202) of the manifold (400, 600, 700) to a first conduit (130);
    coupling the second conduit section (204) of the manifold (400, 600, 700) to a second conduit (130');
    coupling a pickoff (170l, 170r) to at least one of the first conduit (130) or the second conduit (130'); and
    coupling a driver (180) to at least one of the first conduit (130) or the second conduit (130'), the driver (180) being configured to vibrate the first conduit (130) and the second conduit (130').

* * * * *